United States Patent

Momochi

[11] Patent Number: 5,835,663
[45] Date of Patent: *Nov. 10, 1998

[54] APPARATUS FOR RECORDING IMAGE DATA REPRESENTATIVE OF CUTS IN A VIDEO SIGNAL

[75] Inventor: Nobuchika Momochi, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 763,171

[22] Filed: Dec. 10, 1996

Related U.S. Application Data

[63] Continuation of Ser. No. 177,302, Jan. 4, 1994, abandoned.

[30] Foreign Application Priority Data

Jan. 13, 1993 [JP] Japan .................................. 5-004250

[51] Int. Cl.⁶ .................................................. H04N 5/783
[52] U.S. Cl. ............................... 386/61; 386/62; 386/69; 386/70
[58] Field of Search ................... 386/69–70, 95, 386/107–108, 125–126, 52, 60, 61, 62, 4; 360/13, 27, 69, 72.1, 72.2, 78.01, 78.02; 358/909.1, 906; 348/207, 135, 152–155; H04N 5/76, 5/78, 5/782, 5/92, 9/79, 7/18, 5/783

[56] References Cited

U.S. PATENT DOCUMENTS

| | | | |
|---|---|---|---|
| 4,964,004 | 10/1990 | Barker | 358/335 |
| 5,179,449 | 1/1993 | Doi | 358/335 |
| 5,440,401 | 8/1995 | Parulski et al. | 358/335 |

FOREIGN PATENT DOCUMENTS

| | | |
|---|---|---|
| 0 378 393 | 7/1990 | European Pat. Off. |
| 0 472 806 | 3/1992 | European Pat. Off. |
| 0 489 301 | 6/1992 | European Pat. Off. |
| 0545727 | 6/1993 | European Pat. Off. |
| 0 558 306 | 9/1993 | European Pat. Off. |

OTHER PUBLICATIONS

Patent Abstracts of Japan vol. 10, No. 8 (E–373) 14 Jan. 1986 & JP–A–60 172 892 (Toshiba K.K.) 6 Sep. 1985.
Patent Abstracts of Japan vol. 13, No. 285 (E–780) 29 Jun. 1989 & JP–A–01 068 084 (Nippon Telegr. Teleph. Corp., NTT) 14 Mar. 1989.
Patent Abstracts of Japan vol. 15, No. 188 (P–1201) 15 May 1991 & JP–A–03 043 796 (Sanyo Electric Co., Ltd. 25 Feb. 1991.
Patent Abstracts of Japan vol. 17, No. 331 (E–1386) 23 Jun. 1993 & JP–A–05 037 893 (Nippon Hoso Kyokai, NHK) 12 Feb. 1993.
Patent Abstracts of Japan vol. 12, No. 423 (E–680) 9 Nov. 1988 & JP–A–63 158 984 (Victor Co. of Japan) 1 Jul. 1988.
The abstracts of JP# 62–248389. Eisaku Tatsumi, Oct. 29, 1987.

*Primary Examiner*—Thai Tran
*Attorney, Agent, or Firm*—Frommer Lawrence & Haug LLP; William S. Frommer; Dennis M. Smid

[57] ABSTRACT

A video signal from a camera portion is supplied as moving picture data to a moving picture recording portion. The video signal is recorded by the moving picture recording portion with a time code attached thereto. The video signal from the camera portion is supplied to a series circuit of frame memories. The video signal is read from the memories every frame interval and supplied to a comparison calculation portion. In the comparison calculation portion, a change in scene is detected by comparison calculation (judgment of existence of correlation) of video signals having a time difference of one frame therebetween and the detection information of the change in scene is supplied to a controller. When a change in scene is detected, a one-frame portion of video signal is read from the memory under the control of the controller and the read signal is supplied to a still picture recording portion as still picture data to be recorded thereby. At this time, the one-frame portion of video signal is recorded together with a time code which is attached to the one-frame portion of video signal when it is recorded by the moving picture recording portion.

11 Claims, 1 Drawing Sheet

APPARATUS FOR RECORDING IMAGE DATA REPRESENTATIVE OF CUTS IN A VIDEO SIGNAL

This application is a continuation of application Ser. No. 08/177,302, filed Jan. 4, 1994, now abandoned.

BACKGROUND OF THE INVENTION

1. Field of the Invention

The present invention relates to an apparatus for recording image data in which edition and search are facilitated.

2. Related Art

In the field of processing, edition and the like, of a moving picture, it is practiced to manage the address of the image with a time code. For example, in the edition, the time code is used as information for switching image materials. However, what the contents of each image material separated by the time code are is being judged dependent on the memory and the like of the editor.

In the above described field, it has recently been proposed to use the graphical user interface (GUI) of the computer to display representative images of cuts in reduced size as icons, to thereby help the editor comprehend the contents by intuition. There has further been proposed a method in which, when moving pictures are taken in a work station, not only representative images of cuts are displayed in reduced size, but also lengths of the cuts and movements between them are visually expressed (refer to the preprint No. 7 of Image Electronics Association Annual Conference, 1992, pp. 41 to 44.)

In order to display representative images of cuts in reduced size as described above, however, there arises problems that it becomes necessary to carry out such processes as to input image data from a video cassette recorder or the like to the computer, visually confirm breaks between the cuts aided by the computer, and store data of representative images of the cuts into memory, and such processing takes a length of time virtually the same as that required for the image pickup.

SUMMARY OF THE INVENTION

Accordingly, it is an object of the present invention to provide an image data recording apparatus capable, while picking up images, of automatically recording representative image data of each cut together with address information.

According to an aspect of the present invention, there is provided an apparatus for recording image data which comprises first recording means for recording a video signal output from a video camera as moving picture data together with address information, comparison calculation means for detecting a change in scene according to an interframe or interfield correlation of the video signal, and second recording means for recording, when a change in scene is detected by the comparison calculation means, a one-screen portion of the video signal, as still picture data, together with the address information corresponding thereto.

In the present invention, during the image pickup in which a video signal output from a video camera 1 is recorded as moving picture data by a first recording means 2, if a change in scene is detected by a comparison calculation means 6, a one-screen portion of the video signal output from the video camera 1 is recorded as still picture data by a second recording means 7. Accordingly, the need for extracting a representative image of each cut and recording the same after the image pickup has been completed can be eliminated, and the representative image of each cut can be displayed immediately after the image pickup.

Further, since a one-screen portion of a video signal is recorded as still picture data together with corresponding address information by the second recording means 7, the position on a recording medium where the moving picture data corresponding to specific still picture data is recorded can be easily identified according to the address information recorded together with the still picture data.

DESCRIPTION OF THE PREFERRED EMBODIMENT

Figure 1:
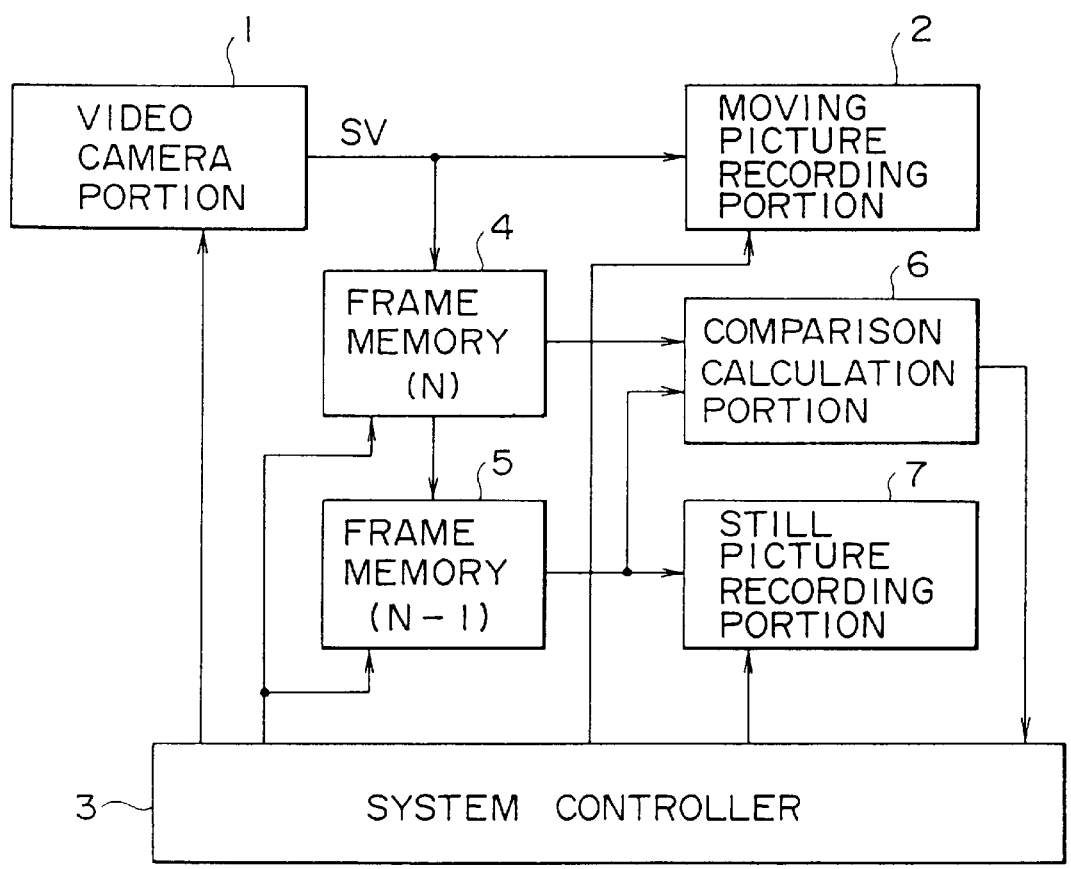
FIG. 1 is a block diagram showing an embodiment of an image recording apparatus according to the invention.

An embodiment of the invention will be described below with reference to FIG. 1.

Referring to the drawing, reference numeral 1 denotes a video camera portion, and operations of the video camera portion 1 are controller by a system controller 3. A video signal VS output from the video camera portion 1 is supplied as moving picture data to a moving picture recording portion 2. The moving picture recording portion 2 is formed for example of a moving picture recording and reproducing apparatus, such as a video tape recorder and a magneto-optical disk apparatus. Operations of the moving picture recording portion 2 are controlled by the controller 3 and the video signal VS together with a time code as address information is recorded on a recording medium such as a tape and a disk.

The video signal VS output from the video camera portion 1 is supplied to frame memories 4 and 5. Write and read operations on these memories 4 and 5 are controlled by the controller 3. In the present case, a video signal of consecutive two frames is written in the memories 4 and 5 and the contents in the memories are updated every frame interval.

The video signal is read from the memories 4 and 5 every frame interval and supplied to a comparison calculation portion 6. The video signals read from the memories 4 and 5 having a time difference of one frame therebetween are subjected to comparison calculation in the comparison calculation portion 6 and, thereby, a change in scene is detected. More specifically, existence of a correlation between consecutive two frames is judged through the comparison calculation, and when there exists no correlation, it is determined that there is made a change in scene. As one of the methods of judging existence of a correlation, there is such a one as to divide each screen into blocks and make histograms of chromaticity for each block, and compare the histograms of the frames by a chi-square test to thereby judge the existence of a correlation (refer to the preprint of the 40th (the first half of the second year of Heisei (1990)) National Conference of the Information Processing Association, pp. 642–643).

The information of detected change in scene output from the comparison calculation portion 6 is supplied to the controller 3. When the information of detected change in scene indicates a change in scene, a one-frame portion of video signal (the video signal for the last cut) is read from the memory 5 under the control of the controller 3 and supplied as still picture data to a still picture recording portion 7 to be recorded thereby. The still picture recording portion 7 is formed of a recording and reproducing device of for example an IC card memory, a disk, and the like. When a one-frame portion of the video signal is recorded by the still picture recording portion 7, the time code, as address information, which is attached to the one-frame video signal when it is recorded by the moving picture recording portion 2, is also recorded.

Incidentally, it is not necessary for the still picture recording portion 7 to write all of the data of the one-frame video signal. For example, in such a case where the image size of the still picture, when it is displayed, is arranged to be smaller than the image size of the moving picture, the data can be recorded with its quantity reduced by taking average values for blocks. Thereby, the storage capacity of the IC card can be saved and, in such case, the storage capacity of the memories 4 and 5 themselves can also be made smaller.

In the present example, every time a change in scene is produced in the video signal VS, a change in scene is detected in the comparison calculation portion 6 and a one-frame portion of video signal is read from the memory 5 and recorded as still-picture data by the still picture recording portion 7. Accordingly, it has become unnecessary in this example to carry out the processes of extracting a representative image of each cut by reproducing image data after completing an image pickup and to record still-picture data as was practiced in the conventional art, but the representative image of each cut can be displayed immediately after an image pickup.

When a one-frame portion of video signal is recorded as still picture data by the still picture recording portion 7, it is recorded together with the time code, which is given to the one-frame portion of video signal when it is recorded by the moving picture recording portion 2, and, therefore, the position on the recording medium in which the moving picture data corresponding to the still picture data is recorded can be easily identified according to the time code recorded with the still picture data.

Since, in the above described embodiment, the one-frame portion of video signal as still picture data is read from the memory 5, it becomes the last video signal or each cut, but it may be that of the first video signal of each cut, that of both the first and the last video signals of each cut, that of the intermediate video signal of each cut, or the like. When a one-frame portion of video signal is that read from the memory 4, the first video signal of each cut can be used as the still picture data.

Although, in the above described embodiment, the judgment of existence of a correlation between video signals is performed in the comparison calculation portion 6 using video signals having a time difference of one frame therebetween, it may also be practiced, by having field memories provided instead of the frame memories 4 and 5, to allow the comparison calculation portion 6 to perform comparison calculation (judgment of existence of correlation) of video signals having a time difference of one field therebetween to thereby detect a change in scene. In such case, the still picture data recorded by the still picture recording portion 7 becomes a one-field portion of video signal.

Although, in the above embodiment, the case where the recording medium recording still picture data in the still picture recording portion 7 is separate from the recording medium for recording the moving picture data in the moving picture recording portion 2 is described, it may be arranged such that the still picture data is recorded in a specific position on the recording medium for recording the moving picture data. In such case, for example the moving picture recording portion 2 and the still picture recording portion 7 are constituted of a disk recording and reproducing device and the moving picture data and the still picture data are recorded in parallel with a plurality of heads. As another way, it may be arranged, by constituting the still picture recording portion 7 of a temporary storage portion, such that plural picture screens of still picture data are read from the still picture recording portion 7 and recorded en bloc in a specific position on the recording medium of the moving picture data.

By recording the still picture data in a specific position on the recording medium for recording moving picture data as described above, the representative image of each cut can be displayed by accessing the specific position on the recording medium after an image pickup, and the representative image can be utilized as an icon visually displaying the contents and, at the same time, the position where each cut is recorded can be easily identified according to the time code recorded together.

Although a type integrated with a camera, i.e., a type in which the video camera portion 1, moving picture recording portion 2, and still picture recording portion 7 are integrated, is shown in the above described embodiment, the invention can be equally applied to the case where a video camera portion 1 and the recording portions 2 and 7 are arranged in separate bodies.

According to the invention, during the image pickup in which a video signal output from a video camera is recorded as moving picture data by a first recording means, a one-screen portion of the video signal output from the video camera is recorded as still picture data by a second recording means when a change in scene is detected by a comparison calculation means and, hence, the need for carrying out the process to extract the representative image of each cut after an image pickup can be eliminated. Therefore, such a meritorious effect can be obtained that a representative image of each cut can be displayed immediately after an image pickup.

Further, a one-screen portion of video signal is recorded as still picture data by the second recording means together with corresponding address information, such a meritorious effect can be obtained that the position on the recording medium in which moving picture data corresponding to specific still picture data is recorded can be easily identified according to the address information recorded together with the still picture data.

What is claimed is:

1. A video signal shooting and recording apparatus comprising:

a camera imaging device for capturing a number of images and for producing a video signal from said number of images and outputting the produced video signal;

first recording means for recording the video signal representative of said number of images as moving picture data together with address information;

first and second memories receiving said video signal for respectively storing image data corresponding to first and second consecutive frames of the received video signal;

means receiving the stored image data from said first and second memories for detecting a change in scene based upon an interframe or interfield correlation of said stored image data while said camera imaging device produces the video signal and outputs the produced video signal; and second recording means for recording a respective frame or portion thereof of said video signal as still picture data from at least one of said first and second memories together with said address information corresponding thereto when the detecting means detects said change in scene while said camera imaging device captures and produces the video signal and outputs the produced video signal, said second recording means enabling each recorded frame or portion to be outputted therefrom so as to enable said still picture data with the corresponding address information to be displayed substantially immediately after said camera imaging device produces said video signal without having to complete the recording of the video signal representative of all of the images by said first recording means and without having to reproduce said video signal with the use of a reproducing device.

2. An apparatus for recording image data according to claim 1, further comprising means for decreasing the data quantity of said still picture data recorded by said second recording means thereby making the size of image of the still picture smaller than the size of image of the moving picture.

3. An apparatus for recording image data according to claim 1, further comprising means for recording said still picture data in a specific position on a recording medium for recording said moving picture data.

4. An apparatus for recording image data according to claim 1, wherein said moving picture data and said still picture data are recorded on separate recording media.

5. An apparatus for recording image data according to claim 4, wherein said recording media for recording said moving picture data and said still picture data are disposed within the same housing.

6. An apparatus for recording image data according to claim 1, wherein said video camera and said first and second recording means are integrally formed.

7. An image data recording apparatus comprising:
  a video camera device for capturing a number of images and for producing a video signal from said number of images and for supplying therefrom said video signal having a plurality of frames of image data;
  first recording means for recording on a first recording medium said video signal representative of said number of images as moving picture data together with address information;
  first and second memories for receiving said video signal and for respectively storing the image data corresponding to first and second consecutive frames;
  comparing means for receiving and comparing the stored image data from said first and second memories so as to detect a change in scene based upon a correlation between the first and second frames of said stored image data; and
  second recording means for recording on a second recording medium a respective frame or portion thereof of said video signal as still picture data from one of said first and second memories together with said address information corresponding thereto when said comparing means detects said change in scene while said video camera device captures and produces said video signal and supplies said video signal, said second recording means enabling each recorded frame or portion to be outputted therefrom so as to enable said still picture data with the corresponding address information to be displayed substantially immediately after said video camera device produces said video signal without having to complete the recording of the video signal representative of all of the images by said first recording means and without having to reproduce said video signal with the use of a reproducing device.

8. A video signal shooting and recording apparatus comprising:
  a camera imaging device for capturing a number of images and for producing a video signal from said number of images and outputting the produced video signal;
  first recording means for recording said video signal representative of said number of images;
  means for producing an indication signal representing a change in scene of the video signal while said camera imaging device produces the video signal and outputs the produced video signal; and
  second recording means responsive to said indication signal for recording a respective frame or portion thereof of said video signal as still picture data together with address information corresponding thereto based on the indication signal when the indication signal represents said change in scene of the video signal while said camera imaging device captures and produces the video signal and outputs the produced video signal, said second recording means enabling each recorded frame or portion to be outputted therefrom so as to enable said still picture data with the corresponding address information to be displayed substantially immediately after said camera imaging device produces said video signal without having to complete the recording of the video signal representative of all of the images by said first recording means and without having to reproduce said video signal with the use of a reproducing device.

9. A video-signal shooting and recording apparatus according to claim 8, further comprising means for displaying the recorded still picture data after a shooting operation of the imaging means is completed.

10. A video signal shooting and recording apparatus according to claim 8, wherein the producing means includes first and second memories receiving said video signal for respectively storing image data corresponding to first and second consecutive frames of the received video signal and means receiving the stored image data from said first and second memories for detecting a change in scene based upon an interframe or interfield correlation of said stored image data.

11. Method of shooting and recording a video signal comprising the steps of:
  capturing a number of images and producing a video signal from said number of images by use of a video camera and outputting the produced video signal;
  recording said video signal representative of said number of images;
  producing an indication signal representing a change in scene of the video signal while said video signal is produced and outputted; and
  recording a respective frame or portion thereof of said video signal as still picture data together with address information corresponding thereto based on the indication signal when the indication signal represents said change in scene of the video signal while said video camera captures and produces said video signal and outputs the produced video signal, in which the step of recording a respective frame or portion enables each recorded frame or portion to be outputted so as to enable said still picture data with the corresponding address information to be displayed substantially immediately after said video camera produces said video signal without having to complete the recording of the video signal representative of all of the images and without having to reproduce said video signal with the use of a reproducing device.

* * * * *